United States Patent
Collins et al.

(10) Patent No.: US 9,776,105 B2
(45) Date of Patent: Oct. 3, 2017

(54) METHOD FOR CONDITIONING AND PROCESSING WHOLE OR THIN STILLAGE TO AID IN THE SEPARATION AND RECOVERY OF PROTEIN AND OIL FRACTIONS

(75) Inventors: John H. Collins, Bloomingdale, IL (US); David W. Scheimann, Joliet, IL (US); Jason S. Van't Hul, Harrisburg, SD (US); Philip M. Eastin, Saint Louis, MO (US)

(73) Assignee: Nalco Company, Naperville, IL (US)

( * ) Notice: Subject to any disclaimer, the term of this patent is extended or adjusted under 35 U.S.C. 154(b) by 796 days.

(21) Appl. No.: 12/949,850

(22) Filed: Nov. 19, 2010

(65) Prior Publication Data
US 2012/0125859 A1    May 24, 2012

(51) Int. Cl.
| | |
|---|---|
| B01D 21/01 | (2006.01) |
| B03D 1/006 | (2006.01) |
| C02F 1/52 | (2006.01) |
| B01D 17/02 | (2006.01) |
| B01D 17/04 | (2006.01) |

(Continued)

(52) U.S. Cl.
CPC ..... *B01D 17/0217* (2013.01); *B01D 17/0205* (2013.01); *B01D 17/042* (2013.01); *B01D 17/047* (2013.01); *C02F 9/00* (2013.01); *C02F 1/40* (2013.01); *C02F 1/52* (2013.01); *C02F 2103/32* (2013.01); *C02F 2303/10* (2013.01); *Y02E 50/17* (2013.01); *Y02W 10/30* (2015.05)

(58) Field of Classification Search
CPC  B01D 17/0217; B01D 17/042; B01D 17/047; Y02E 50/17; C02F 1/40; C02F 1/52; C02F 9/00; C02F 2103/32; C02F 2303/10
USPC ....... 210/705, 706, 708, 723–736, 702, 703, 210/704, 707, 774, 787, 804; 426/11, 14; 435/161; 44/307, 605; 127/34, 37; 554/175
See application file for complete search history.

(56) References Cited

U.S. PATENT DOCUMENTS

| | | |
|---|---|---|
| 4,702,798 A | 10/1987 | Bonanno |
| 5,283,322 A | 2/1994 | Martin et al. |

(Continued)

OTHER PUBLICATIONS

Menkhaus et al, "Polyelectrolyte flocculation of grain stillage for improved clarification and water recovery within bioethanol production facilities", Bioresource Technology 101 (2010) 2280-2286—available online Dec. 5, 2009.*

(Continued)

*Primary Examiner* — Claire Norris
(74) *Attorney, Agent, or Firm* — Leydig, Voit & Mayer, Ltd.

(57) ABSTRACT

A method of processing thin stillage in an ethanol refining operation is provided. The method comprises treating thin stillage upstream of a concentration or evaporation step with an inverse emulsion comprising at least one anionic flocculant and an emulsifying agent selected from a sorbitan ester of a fatty acid, an ethoxylated sorbitan ester of a fatty acid, and combinations thereof, thereby forming treated thin stillage; clarifying the treated thin stillage via at least one of dissolved air flotation and induced air flotation, thereby forming clarified thin stillage and a float layer comprising oil and solids; separating the oil from the solids of the float layer; and recovering the oil.

23 Claims, 2 Drawing Sheets

(51) Int. Cl.
*C02F 9/00* (2006.01)
*C02F 1/40* (2006.01)
*C02F 103/32* (2006.01)

(56) References Cited

U.S. PATENT DOCUMENTS

| | | | |
|---|---|---|---|
| 5,558,781 | A | 9/1996 | Buchold et al. |
| 5,605,970 | A | 2/1997 | Selvarajan |
| 5,662,810 | A | 9/1997 | Willgohs |
| 5,837,776 | A | 11/1998 | Selvarajan et al. |
| 5,958,233 | A | 9/1999 | Willgohs |
| 5,985,992 | A | 11/1999 | Chen |
| 6,013,157 | A | 1/2000 | Li et al. |
| 6,265,477 | B1 | 7/2001 | Hurlock |
| 6,548,102 | B2 | 4/2003 | Fenske et al. |
| 7,309,602 | B2 | 12/2007 | David |
| 7,497,955 | B2 | 3/2009 | Scheimann et al. |
| 7,566,469 | B2 | 7/2009 | Scheimann |
| 7,601,858 | B2 | 10/2009 | Cantrell et al. |
| 7,602,858 | B2 | 10/2009 | Dally |
| 7,608,729 | B2* | 10/2009 | Winsness et al. ............. 554/9 |
| 7,641,928 | B2 | 1/2010 | Jump et al. |
| 8,192,627 | B2 | 6/2012 | Gallop et al. |
| 8,841,469 | B2 | 9/2014 | Shepperd et al. |
| 8,962,059 | B1 | 2/2015 | Froderman et al. |
| 2006/0006116 | A1* | 1/2006 | Scheimann et al. .......... 210/728 |
| 2006/0041152 | A1* | 2/2006 | Cantrell ................ B01D 3/004 554/8 |
| 2006/0041153 | A1 | 2/2006 | Cantrell et al. |
| 2006/0193700 | A1* | 8/2006 | Putnam ................ C09K 17/18 405/264 |
| 2006/0194296 | A1* | 8/2006 | Hammond et al. .......... 435/161 |
| 2007/0042094 | A1* | 2/2007 | Warf et al. .................... 426/332 |
| 2007/0210007 | A1 | 9/2007 | Scheimann et al. |
| 2008/0176298 | A1 | 7/2008 | Randhava et al. |
| 2008/0299632 | A1 | 12/2008 | Winsness et al. |
| 2009/0259060 | A1 | 10/2009 | Cantrell et al. |
| 2010/0331580 | A1 | 12/2010 | Ridgley |
| 2013/0319949 | A1* | 12/2013 | Booth et al. .................. 210/703 |

OTHER PUBLICATIONS

Davis, Kelly S., "Corn Milling, Processing and Generation of Co-Products," Minnesota Nutrition Conference, Technical Symposium, Sep. 11, 2001, 7 pp.

Kadioglu et al., "Surfactant-Based Oil Extraction of Corn Germ," J. Am Oil Chem. Soc., 2011, 88:863-869.

Klinkesorn et al., "Stability and Rheology of Corn Oil-in-Water Emulsions Containing Maltodextrin," Food Research International, 2004, 37:851-859.

Taherzadeh et al., "Enzyme-Based Hydrolysis Process for Ethanol from Lignocellulosic Materials: A Review," 2007, 2(4):707-738.

Wang et al., "Effect of Low-Shear Extrusion on Corn Fermentation and Oil Partition," J. Agric. Food Chem., 2009, 57:2302-2307.

"The HLB System: A Time-Saving Guide to Emulsifier Selection," ICI Americas Inc., Wilmington, DE, 1984, 22 pp.

"The nomenclature of lipids (Recommendations 1976) IUPAC-IUB Commission on Biochemical Nomenclature," *Biochemical J.*, Apr. 1, 1978, 171(1), pp. 21-35.

Alther, "Put the Breaks on Wastewater Emulsions," *Chemical Engineering*, 105(3), Mar. 1998, pp. 82-88.

Babayan, "Specialty Lipids and Their Biofunctionality," *Lipids*, 22(6), Jun. 1987, pp. 417-420.

Frison-Norrie et al., "Investigating the Molecular Heterogeneity of Polysorbate Emulsifiers by MALDI-TOF MS," *J. of Agricultural and Food Chemistry*, 49(7), Jul. 2001, pp. 3335-3340.

Food and Agriculture Organization of the United Nations, "Sorbitan Monolaurate," C.A.S. No. 1228-39-2, 2000, downloaded from http://www.fao.org/ag/agn/jecfa-additives/specs/Monograph1/Additive-431.pdf on Sep. 17, 2015, 1 p.

Food and Agriculture Organization of the United Nations, "Sorbitan Monooleate," C.A.S. No. 1338-43-8, 2000, downloaded from http://www.fao.org/ag/agn/jecfa-additives/specs/Monograph1/Additive-432.pdf on Sep. 17, 2015, 1 p.

Food and Agriculture Organization of the United Nations, "Sorbitan Monostearate," C.A.S. No. 1338-41-6, 2000, downloaded from http://www.fao.org/ag/agn/jecfa-additives/specs/Monograph1/Additive-434.pdf on Sep. 17, 2015, 2 pp.

Hydrite Chemical Co., "Petition for Inter Partes Review of U.S. Pat. No. 8,841,469," Jul. 14, 2015, 73 pp.

Hydrite Chemical Co., "Petition for Inter Partes Review of U.S. Pat. No. 8,962,059," Jul. 14, 2015, 72 pp.

Mukesh et al., "Lipase Catalysed Esterification of Isosorbide and Sorbitol," *Biotechnology Letters*, 15(12), Dec. 1993, pp. 1243-1246.

McNaught et al., "Compendium of Chemical Terminology: IUPAC Recommendations," 2nd ed., Blackwell Science, Malden, MA, 1997, pp. 16, 166.

Mukerjee et al., "Critical Micelle Concentrations of Aqueous Surfactant Systems," National Standard Reference Data System, 1971, 7 pp.

* cited by examiner

METHOD FOR CONDITIONING AND PROCESSING WHOLE OR THIN STILLAGE TO AID IN THE SEPARATION AND RECOVERY OF PROTEIN AND OIL FRACTIONS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates generally to a system and method for the conditioning of a dry milling stillage process stream with flocculant in order to facilitate further processing, separation, and recovery of solids, fats, and oils from the stillage. The dry milling process is a method of manufacturing ethanol. In this process, corn is ground up and processed to produce a "beer mash" which is fermented to form ethanol. Once the stream reaches the desired ethanol content the material it's then transferred to a stripper column. The stripper column facilitates recovery and removal of the ethanol and the remainder, known as whole stillage is passed on for further processing.

Whole stillage contains all of the non-fermentable components of the corn kernels including germ, protein, gluten, fiber as well as fats and oils and a small amount of starch in addition to dead yeast cells. Whole stillage typically contains 9%-14% totals solids of which 4% to 10% are suspended solids and 4% to 5% are dissolved solids. Many of the components of whole stillage are valuable and considerable attention has been paid in the industry to develop methods to separate and recover those components.

In prior art attempts such as U.S. Pat. Nos. 5,662,810, 5,958,233, 7,497,955, 7,566,469, 7,608,729, and 7,601,858 and US Published Patent Applications 2009/0259060, 2006/0041153, and 2008/0299632 describe various uses of heat and centrifuge pressures applied to whole stillage, thin stillage or syrup to recover at least some of these components. Typically prior art processes involve centrifuging away water from the whole stillage thereby forming concentrated solids wet cake and low solids thin stillage streams. The thin stillage then undergoes some form of drying or evaporation to form a viscous syrup. Part of the thin stillage stream may be reused in the process by recirculating to the front of the plant as backset and mixing it with new corn. The syrup is typically added to other solids recovered from the process to form a mass commonly known as distiller dry grains and solubles (DDGS), which can be used as an animal feed.

One constraint on these prior art recovery processes is the energy required for each separation step. Each step addresses ever-increasing proportion of solid materials or ever increasing viscosity of liquids. As a result significant energy, cost, and mechanical separation efforts are utilized to successfully separate these components.

Thus there is clear need and utility for improved methods, systems, and apparatus for conditioning whole, thin stillage concentrated thin stillage, and syrup. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of reducing the energy needed to process stillage in an ethanol refining operation. The method comprises the steps of: 1) adding to stillage an effective amount of at least one anionic flocculant, 2) recovering oil from the predominantly oil phase, and 3) passing on the water phase to subsequent refining operation steps. The flocculant induces the formation of three phases, a water phase, a particle phase, and an oil phase. The oil phase by weight predominantly comprises oil. The water phase by weight predominantly comprises water. The particle phase by weight predominantly comprises an agglomeration of materials that would otherwise be suspended in the stillage. There is more protein in the particle phase than in the oil phase.

The subsequent refining operation may be the recovery of solids from the water phase. The subsequent refining operation step may be the reintroduction of the water phase to the fermentation stage of the refining process as backset. At least one anionic flocculant may be added in a GEM. The at least one anionic flocculant may be GRAS certified. The addition of the at least one anionic flocculant may result in a greater amount of stillage to be processed by using less energy than if the at least one anionic flocculant were not added. The method may further comprise the step of recovering corn oil from the particle phase. The method may further comprising the steps of heating and mechanically processing one item selected from the list consisting of: the particle phase, the oil phase, the water phase, and any combination thereof to separate oil from the heated and mechanically processed phase. The mechanical processing may comprise separating the oil from the heated and mechanically processed phase using a disk stack centrifuge. The oil recovery may be performed on the heated and mechanically processed phase at a temperature of between about 150 and 212 degrees F. The oil recovery may be performed on a heated and mechanically processed phase that has a pH of between about 3 and 6.

At least one embodiment of the invention is directed towards a method of reducing the energy needed to process stillage in an ethanol refining operation. The method comprises the steps of: 1) adding to stillage an effective amount of at least one processing aid pair and 2) passing on the water phase to subsequent refining operation steps. The pair induces the formation of three phases, a water phase, a particle phase, and a predominantly oil phase. The water phase predominantly comprises water. The particle phase predominantly comprises an agglomeration of materials that would otherwise be suspended in the stillage. The pair is selected from the group consisting of: an anionic flocculant with a cationic flocculant, an anionic coagulant with a cationic flocculant, and a cationic coagulant with an anionic flocculant.

BRIEF DESCRIPTION OF THE DRAWINGS

A detailed description of the invention is hereafter described with specific reference being made to the drawings in which.

DETAILED DESCRIPTION OF THE INVENTION

Figure 1:
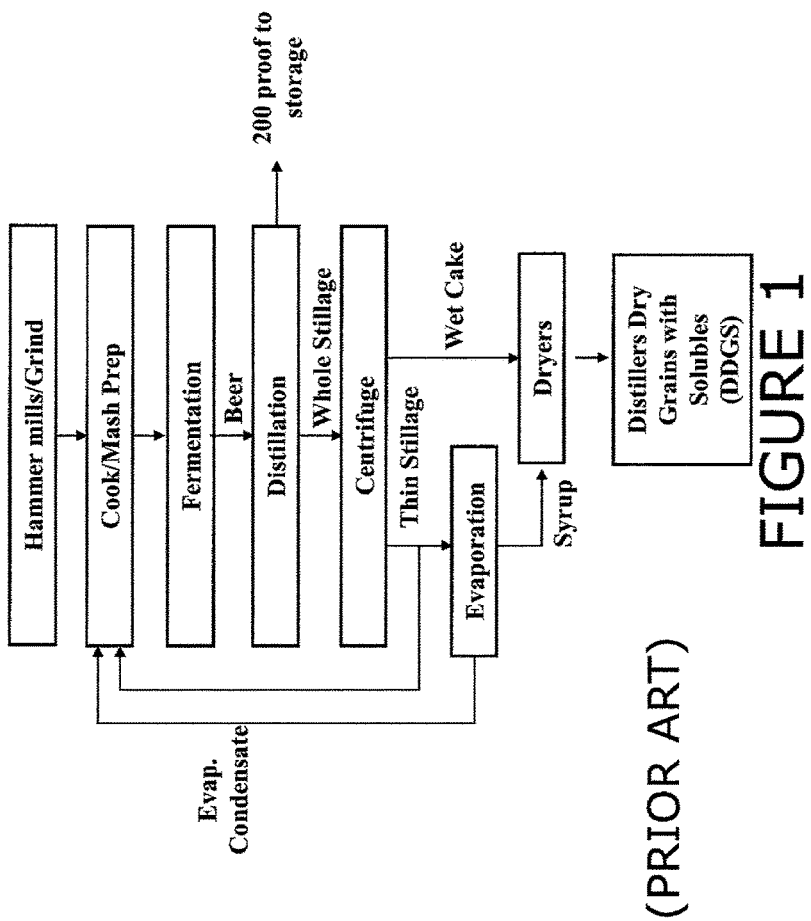
FIG. 1 is a flowchart illustrating a prior art method of recovering oil from stillage.
Figure 2:
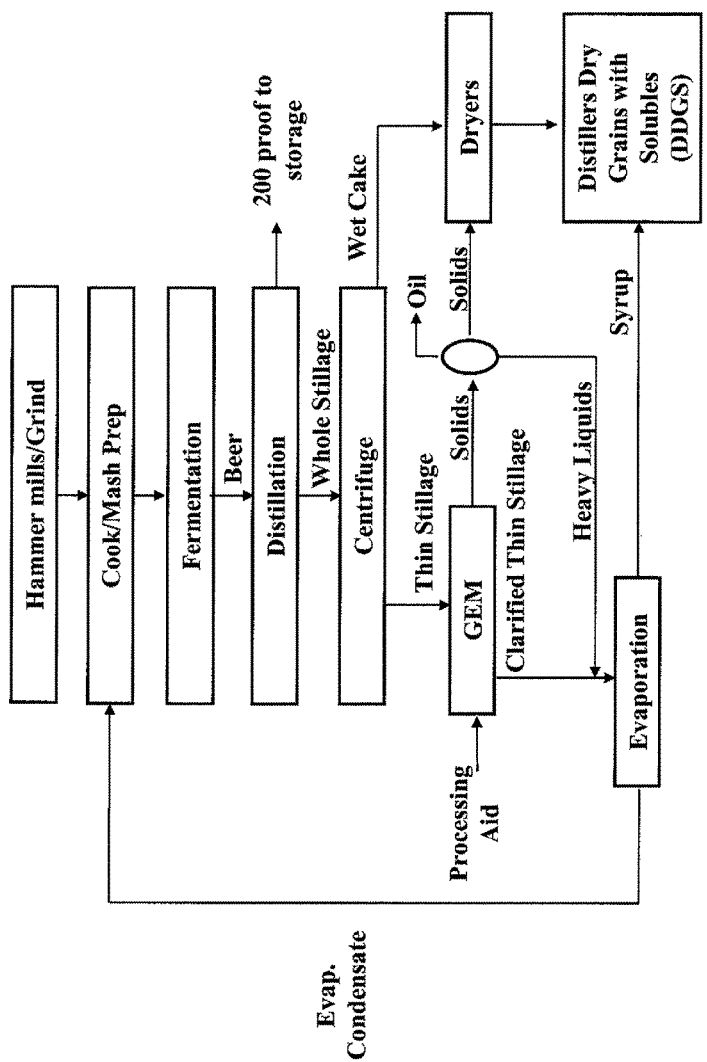
FIG. 2 is a flowchart illustrating one manner of implementing the inventive method on stillage.

For purposes of this application the definition of these terms is as follows:

"Acrylamide monomer" means an electrically neutral monomer derived from acrylamide. Representative acrylamide monomers include acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, and the like. Preferred acrylamide monomers include acrylamide and methacrylamide. Acrylamide is more preferred.

"Backset" means that portion of thin stillage that is returned to the front of plant and mix with corn for additional ethanol production.

"Coagulant" means a chemical, which induces coagulation, i.e. it induces the initial agglomeration of material suspended within a liquid "Concentrated Thin Stillage" means a portion of the thin stillage stream that has passed through a concentration or evaporation stage and ranges between what would be considered "backset" and what would be considered "syrup".

"Cross-linking agent" means a multifunctional monomer that when added to polymerizing monomer or monomers results in "cross-linked" polymers in which a branch or branches from one polymer molecule become attached to other polymer molecules.

"Dispersion Polymers" mean a water-soluble polymer dispersed in an aqueous continuous phase containing one or more inorganic salts. Representative examples of dispersion polymerization of water-soluble anionic and nonionic monomers in an aqueous continuous phase can be found in U.S. Pat. Nos. 5,605,970, 5,837,776, 5,985,992 and 6,265,477.

"Dry polymer" means a polymer prepared by gel polymerization.

"Emulsion polymer" and mean an invertible water-in-oil polymer emulsion comprising an anionic polymer according in the aqueous phase, a hydrocarbon oil for the oil phase, a water-in-oil emulsifying agent and, potentially, an inverting surfactant.

"Flocculant" means a chemical, which induces flocculation, i.e. it induces the enhanced agglomeration of material suspended within a liquid either alone or after coagulation when the liquid is stirred or otherwise mixed.

"Gel Polymerization" means a process for producing polymers as dry powders.

"Inverse emulsion polymers" mean polymers which position hydrocarbon continuous within the water-soluble polymers dispersed as micron sized particles within the hydrocarbon matrix.

"Latex polymer" means an emulsion polymer that forms rubber or plastic globules in water.

"Solids" means the not water portions of corn that remain in stillage after distillation including: germ, protein, gluten, hull, and carbohydrates.

"Stillage" means whole stillage and/or thin stillage either as generated in the process or in a concentrated form (meaning additional water may be removed).

"Syrup" means that portion of thin stillage that has passed through a concentration or evaporation process and has reached the optimum solids level for application to wet feed or DDGS drying operations.

"Thin stillage" means that portion of a corn processing stream remaining after the whole stillage has passed through a centrifuge where the more heavy wet cake has been removed.

"Whole stillage" means that portion of a corn processing stream remaining after the corn-based material has passed through a distillation process where ethanol has been removed.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a, dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

As illustrated in FIG. 1, in prior art applications, the processing requirements of the various products of a dry milling stillage process stream require significant inputs of energy to carry out. Under current operating conditions, it is common for an ethanol plants to produce anywhere from 20 to 300 MGY (millions of gallons per year) of ethanol which will typically result in 260 to 4000 gpm (gallons per minute) whole stillage into the centrifuges and will generate 200 to 3000 gpm of thin stillage. With 40 to 50% of the thin stillage being utilized as backset it may result in 100 to 1500 gpm of thin stillage being returned to the front of the plant. This process is analogous to recycling 30-500 pounds of non-fermentable material back to the head of the plant every hour, an inefficient utilization of resources in an energy intensive process.

In at least one embodiment, the energy required to process (whole stillage, thin stillage, concentrated thin stillage or syrup) is lowered by reducing the amount of suspended solids present within the stillage. Suspended solids distribute mass throughout the stillage and when the stillage undergoes shear forces in separation equipment, the suspended solids significantly increase the energy required to properly separate the suspended solids and remove water from the stillage. Reducing the needed energy reduces the energy required in the solids separation steps of any of the de-watering processes including centrifuging or filtration and reduces the amount of energy required for removing water during concentration or evaporation.

In at least one embodiment a float layer is formed from the solids found in the whole stillage, centrifuge thin stillage, concentrated thin stillage or syrup stream. In at least one embodiment the thin stillage solids, fats and oils are concentrated and recovered on a float layer using a DAF (dissolved air flotation unit) or IAF (induced air flotation unit). Other embodiments contemplated by this invention include the removal of thin stillage solids by other sold/liquid separation devices such as a centrifuge, a recessed chamber filter press, rotary drum vacuum filters, belt presses, vacuum filters, pressure filters or membrane filtration.

In at least one embodiment the suspended solids are removed by the addition of an anionic flocculant to the stillage. The anionic flocculant creates a concentrated solids layer containing corn oil and insoluble protein. This concentrated layer in turn can be separated using known oil/solid/water separation techniques such as decanter, tricanter and stacked disk centrifuges.

It is quite unexpected that anionic flocculant works as well as it does in recovering oil. Anionic polymeric flocculants are normally used to facilitate the aggregation of solids by attracting positively charged particles to the negatively charged polymer backbone. This increases the particle size and increases the rate of solid separation from carrier liquid, which is usually water. In stillage this should result in better solids separation in the dewatering devices. However, it has been found that the addition of anionic flocculants also increases the amount of oil removed from the stillage solids particles, an unexpected bonus feature.

In at least one embodiment also added to the stillage is a cationic flocculant. In at least one embodiment also added to the stillage is an anionic and/or cationic coagulant. In at least one embodiment, high shear particles that would not be removed by the methods described in U.S. Pat. Nos. 7,641,928, 7,566,469, and 7,497,955 are removed by the anionic flocculant, and those particles that remain in the water are then removed by the methods described in U.S. Pat. Nos. 7,641,928, 7,566,469, and 7,497,955. In at least one embodiment, the stillage is placed into a GEM DAF into which the flocculant is also added by preconditioning the stream in a mixing zone.

In at least one embodiment the flocculant and/or coagulant used is GRAS approved, meaning it satisfies the requirements for the United States' FDA category of compounds that are "Generally Recognized as Safe." Because the flocculant and/or coagulant are GRAS approved, it need not be removed and can be included in the distiller grains and be fed to livestock and/or other animals when used within the dosage and application guidelines established for the particular product formulation.

In at least one embedment an ethanol processing facility can process more stillage while using no more energy or can process stillage faster while using no more energy by reducing the shear energy requirements and improving unit operation and process efficiency when the suspended solids are removed from the stillage.

In at least one embodiment, the composition of the backset is changed by removing the suspended solids. In prior art methods, certain solid materials are only removed with difficulty because they remain suspended in the stillage and return to the front of the plant within the backset. Industry tends to re-use backset because it allows otherwise escaped materials to be recaptured on subsequent processing. Also backset liquid reduces the need for additional fresh water lowering water costs. Unfortunately, highly suspended materials thereby continually increase in concentration each time the backset is recaptured and as a result shear energy requirement perpetually increase. By removing the suspended solids, water savings can still be achieved, solids do not escape, and shear forces do not invariably rise.

In at least one embodiment the flocculant and/or coagulant facilitates the increased production of ethanol by improving the quality of the backset. In at least one embodiment the flocculant and/or coagulant reduces the energy requirements of the system by chemically concentrating the thin stillage. In at least one embodiment the flocculant and/or coagulant facilitates the increased recovery of grain solids and corn oil.

In at least one embodiment, the recovery of oil from a thin stillage sample is enhanced by the addition of a pair of processing aids. At least one member of the pair is one selected from a coagulant and a flocculant. At least one member of the pair may be anionic or cationic. Other aid or aids may be added in addition to the pair.

In at least one embodiment the thin stillage is aged for a short period of time (between 0.5 and 10 hours). "Aged" refers to the time that the stillage is left to sit in contact with one or more aids before heat and pressure are applied to this mixture of the stillage and one or more aids. In at least one embodiment, the temperature applied to the aged mixture is relatively low, for example between 135 and 180 degrees F. While it would not expect for such a low temperature to result in high oil yields, in fact it does result in high oil yields.

In at least one embodiment the addition of one or more of the aids to thin stillage results in a two phase product, one phase is rich in solids such as proteins and one is predominantly water. In at least one embodiment the addition of one or more processing aids to thin stillage results in a three phase product, one phase is rich in insoluble materials such as solids and/or proteins, one is predominantly water, and one is predominantly oil. The formation of a free standing oil layer vastly reduces the cost of otherwise removing oil from either of the water or in particular the insoluble material phases.

In at least one embodiment, an aid is used to recover oil from the thin stillage by forming different phase layers. In at least one embodiment the aid comprises an anionic polymer. Anionic polymers suitable for use in the method of this invention include those prepared by polymerizing acrylic acid sodium salt, methacrylic acid sodium salt or 2-acrylamido-2-methyl-1-propanesulfonic acid sodium salt or a combination thereof and optionally one or more acrylamide monomers under free radical forming conditions using methods known in the art of polymer synthesis. Many anionic polymers are commercially available, for example from Nalco Company, Naperville, Ill.

In at least one embodiment the anionic polymer are cross-linked with about 0.005 to about 10 ppm of one or more cross linking agents. Representative cross-linking agents include but are not limited to N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal, vinyltrialkoxysilanes and the like. Preferred cross-linking agents are selected from N,N-methylenebisacrylamide, polydiethyleneglycoldimethacrylate, trimethylolpropane ethoxylate (x EO/y OH) tri(meth)acrylate, where x=1-20 and y=1-5, trimethylolpropane propoxylate (x EO/y OH) triacrylate, where x=1-3 and y=1-3, and 2-hydroxyethylmethacrylate.

In at least one embodiment the anionic polymers are one or more of: dry polymers, emulsion polymers, inverse emulsion polymers, latex polymers, and dispersion polymers. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

In at least one embodiment the inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

In at least one embodiment the oil phase comprises one or more or any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

In at least one embodiment the polymerization is facilitated by free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

In at least one embodiment water-in-oil emulsifying agents are used for preparing the emulsion polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, polyoxyethylene sorbitan monolaurate, and the like. The sorbitan can be substituted with sucrose, glycol, glycerin, and the like. Additional details on these agents may be found in McCutcheon's Detergents and Emulsifiers, North American Edition, 1980. Any inverting surfactant or inverting surfactant mixture described in the prior art may be used. The amount the preferred emulsifying agent utilized can be varied in order to optimize polymer make down and also improve separation and recovery of the fats oil and greases present in the process stream. While the preferred method is the utilization of latex flocculants, it's also possible to feed the anionic flocculants as described alone or in combination with an additional point source feed of one of the described surfactants in order to facilitate and optimize separation and recovery of the corn oil. Representative inverting surfactants include ethoxylated nonylphenol, ethoxylated linear alcohols, and the like. Preferred inverting surfactants are ethoxylated linear alcohols.

Upon flocculant addition to dry milling stillage process streams these same emulsifying agents and/or surfactants interact with the corn oil which is either bound to the surfaces of the solid constituents of the stillage or they interact with the unattached oil present in these dry milling streams. This interaction enables the corn oil to break free from the solid surfaces and be removed by separation process such as high speed centrifugation. These same surface active chemicals help emulsify unattached oil preventing attachment to solid material present in the stillage process streams which also aids in the removal of corn oil from the stillage.

In at least one embodiment, the polymer is prepared by polymerizing the appropriate monomers at from about 30 degrees C. to about 85 degrees C., over about 1 to about 24 hours, preferably at a temperature of from about 40 degrees C. to about 70 degrees C. over about 3 to about 6 hours.

In at least one embodiment the aid comprises a dispersion polymer. Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. Water-continuous dispersions of water-soluble polymers are free flowing liquids with product viscosities generally 100-10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

In at least one embodiment the aid comprises a dry polymer. In at least one embodiment the aid comprises a gel polymer. The preparation of high molecular weight water-soluble polymers as dry powders using a gel polymerization is generally performed as follows: an aqueous solution of water-soluble monomers, generally 20-60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

In at least one embodiment an anionic polymer is used which has an anionic charge of about 10 to about 100 mole percent, more preferably about 30 to about 70 mole percent and most preferable with an anionic charge of about 35 to about 45 mole percent. In a preferred aspect of this invention, the anionic polymer is selected from the group consisting of acrylamide-acrylic acid sodium salt copolymer and acrylamide-2-acrylamido-2-methyl-1-propanesulfonic acid sodium salt copolymer.

In another preferred aspect, the aid comprises: acrylamide-acrylic acid sodium salt copolymers, acrylamide-2-acrylamido-2-methyl-1-propanesulfonic acid sodium salt copolymer one or both having a 25 anionic charge of about 10 to about 90 mole percent, and any combination thereof.

In another preferred aspect, acrylamide-acrylic acid sodium salt copolymer and acrylamide-2-acrylamido-2-methyl-1-propanesulfonic acid sodium salt copolymer have an anionic charge of about 30 to about 70 mole percent. In another preferred embodiment, the anionic polymer is acrylamide-sodium acrylate-sodium methacrylate terpolymer. In another preferred embodiment, the acrylamide-sodium acrylate-sodium methacrylate terpolymer has an anionic charge of about 1 to about 50 mole percent. The anionic polymers preferably have a reduced specific viscosity of about 10 to about 60 dl/g, more preferably about 15 to about 40 dl/g. "Reduced specific viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

Wherein η=viscosity of polymer solution; $\eta_o$=viscosity of solvent at the same temperature; and c=concentration of polymer in solution. As used herein, the units of concentration "c" are (grams/100 ml or g/deciliter). Therefore, the units of RSV are dl/g. The RSV is measured at 30.degree. C. The viscosities η and $\eta_o$ are measured using a Cannon-Ubbelohde semimicro dilution viscometer, size 75. The viscometer is mounted in a perfectly vertical position in a constant temperature bath adjusted to 30.+−.0.02.degree. C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

The effective dosage, addition point(s) and mode of addition of anionic polymer to the thin stillage process stream can be empirically determined to obtain the proper polymer/particle interaction and optimize the chemical treatment program performance. For higher RSV product samples more mixing is typically required. For lower RSV polymers less mixing is required.

The amount of aid required for optimum dewatering is based upon a number of factors including inverted polymer concentration, thin stillage process stream solids, available polymer/particle mixing energy and the type of dewatering device used. A preferred polymer dosage is about 50 to about 500 ppm of anionic polymer is added to the thin stillage process stream.

Emulsion polymers are typically inverted as a 0.1 to 5.0 percent by weight solution in clean water according to standard practices for inverting latex flocculants as described herein. The polymer is applied to the thin stillage or thin slop process stream. Dry anionic polymer flocculants are used in a similar fashion with the product being made up at concentrations of 0.1 to 1.5 percent polymer product according to the standard practices and recommended polymer aging times for preparing dry flocculants.

EXAMPLES

The foregoing may be better understood by reference to the following example, which is presented for purposes of illustration and is not intended to limit the scope of the invention.

A number of 40 ml samples of thin stillage were prepared for treatment under different conditions in 50 ml centrifube tubes. Sample category A was a control having no additive. Category B had 0.5 ml of an anionic flocculant (GR-109 by Nalco Company, Naperville, Ill.) added to it. Category C had 1 ml of anionic flocculant added to it. Each sample was subjected to various temperatures and pressures and was then placed in a centrifuge where it was spun for 30 minutes in a vessel at 4,400 rpm. The following describes the treatments the various samples were subjected to and the results of the treatment.

TABLE 1

| Temperature (° F.) | Pressure (psi) | Emulsion (ml) Sample A | Emulsion (ml) Sample B | Emulsion (ml) Sample C | Oil Layer (ml) Sample A | Oil Layer (ml) Sample B | Oil Layer (ml) Sample C |
|---|---|---|---|---|---|---|---|
| 70 | 0 | 3 | 3 | 3 | 0 | 0 | 0 |
| 212 | 0 | 3 | 9 | 9 | 0 | 0.5 | 0.5 |
| 220 | 2.5 | 2.5 | 13 | 13 | 0.5 | 0.75 | 0.75 |
| 230 | 6.1 | 1 | 10 | 10 | 1 | 1 | 1 |

The data shows the unexpected results of the anionic flocculant. In the absence of an anionic flocculant temperature, pressure, and spinning only results in an emulsion layer being removed from the stillage samples. In contrast a small addition of anionic flocculants results in a distinct oil layer coming into being, distinct from the emulsion layer. Thus the anionic flocculant reduces the cost of removing the oil by reducing the number of processing steps needed to recover it.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g.

2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of processing thin stillage in an ethanol refining operation comprising:
   treating thin stillage upstream of a concentration or evaporation step with an inverse emulsion comprising at least one anionic flocculant and an emulsifying agent selected from a sorbitan ester of a fatty acid, an ethoxylated sorbitan ester of a fatty acid, and combinations thereof, thereby forming treated thin stillage;
   clarifying the treated thin stillage via at least one of dissolved air flotation and induced air flotation, thereby forming clarified thin stillage and a float layer comprising oil and solids;
   separating the oil from the solids of the float layer; and recovering the oil.

2. The method of claim 1, wherein the emulsifying agent is polyoxyethylene sorbitan monostearate.

3. The method of claim 1, wherein the thin stillage is treated with an amount of the inverse emulsion sufficient to provide a concentration of from about 50 ppm to about 500 ppm of total anionic flocculant in the thin stillage.

4. The method of claim 1, wherein the separating the oil from the solids of the float layer is performed via heating and mechanical processing.

5. The method of claim 4, wherein the mechanical processing is performed via at least one of a decanter, a tricanter, and a stacked disk centrifuge.

6. The method of claim 5, wherein the mechanical processing is performed via a stacked disk centrifuge.

7. The method of claim 6, wherein the heating and mechanical processing is performed at a temperature of from about 50° F. to 220° F.

8. The method of claim 7, wherein the heating and mechanical processing is performed at a temperature of from about 150° F. to 212° F.

9. The method of claim 1, wherein the emulsifying agent is sorbitan monooleate.

10. The method of claim 1, wherein the emulsifying agent is polyoxyethylene sorbitan monolaurate.

11. The method of claim 1, further comprising aging the treated thin stillage from 0.5 hours to 10 hours prior to the clarifying.

12. A method of processing thin stillage in an ethanol refining operation comprising:
   inverting an inverse emulsion comprising at least one anionic flocculant and an emulsifying agent selected from a sorbitan ester of a fatty acid, an ethoxylated sorbitan ester of a fatty acid, and combinations thereof, by combining the inverse emulsion with water and an inverting surfactant, thereby forming a latex;
   treating thin stillage upstream of a concentration or evaporation step with the latex, thereby forming treated thin stillage;
   clarifying the treated thin stillage via at least, one of dissolved air flotation and induced air flotation, thereby forming clarified thin stillage and a float layer comprising oil and solids;
   separating the oil from the solids of the float layer; and recovering the oil.

13. The method of claim 12, wherein the emulsifying agent is polyoxyethylene sorbitan monostearate.

14. The method of claim 13, wherein the clarified thin stillage has a pH of from about 3 to about 6.

15. The method of claim 14, wherein the thin stillage is treated with an amount of inverse emulsion sufficient to provide a concentration of from about 50 ppm to about 500 ppm of total anionic flocculant in the thin stillage.

16. The method of claim 12, wherein the separating the oil from the solids of the float layer is performed via heating and mechanical processing.

17. The method of claim 16, wherein the mechanical processing is performed via at least one of a decanter, a tricanter, and a stacked disk centrifuge.

18. The method of claim 17, wherein the mechanical processing is performed via a stacked disk centrifuge.

19. The method of claim 18, wherein the heating and mechanical processing is performed at a temperature of from about 150° F. to 220° F.

20. The method of claim 19, wherein the heating and mechanical processing is performed at a temperature of from about 150° F. to 212° F.

21. The method of claim 12, wherein the emulsifying agent is sorbitan monooleate.

22. The method of claim 12, wherein the emulsifying agent is polyoxyethylene sorbitan monolaurate.

23. The method of claim 12, further comprising aging the treated thin stillage from 0.5 hours to 10 hours prior to the clarifying.

* * * * *

UNITED STATES PATENT AND TRADEMARK OFFICE
CERTIFICATE OF CORRECTION

PATENT NO. : 9,776,105 B2  
APPLICATION NO. : 12/949850  
DATED : October 3, 2017  
INVENTOR(S) : John H. Collins et al.

Page 1 of 1

It is certified that error appears in the above-identified patent and that said Letters Patent is hereby corrected as shown below:

In the Claims

At Column 11, Line 37, Claim 7 delete "beating" and insert --heating--

At Column 12, Line 12, Claim 12 delete "at least, one of" and insert --at least one of--

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*